United States Patent
Pap et al.

(10) Patent No.: US 11,708,889 B2
(45) Date of Patent: Jul. 25, 2023

(54) PIVOT FOR A TURBOMACHINE MECHANICAL REDUCTION GEAR

(71) Applicant: SAFRAN TRANSMISSION SYSTEMS, Colombes (FR)

(72) Inventors: Balint Pap, Moissy-Cramayel (FR); Jordane Emile André Peltier, Moissy-Cramayel (FR); Antoine Jacques Marie Pennacino, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/872,239

(22) Filed: Jul. 25, 2022

(65) Prior Publication Data

US 2023/0023320 A1   Jan. 26, 2023

(30) Foreign Application Priority Data

Jul. 24, 2021  (FR) ...................................... 2108047

(51) Int. Cl.
*F16H 57/04* (2010.01)
*F16H 1/28* (2006.01)

(52) U.S. Cl.
CPC ........... *F16H 57/0482* (2013.01); *F16H 1/28* (2013.01); *F16H 57/043* (2013.01); *F16H 57/0427* (2013.01); *F05D 2260/40311* (2013.01)

(58) Field of Classification Search
CPC . F16H 57/0482; F16H 57/043; F16H 57/0427
See application file for complete search history.

(56) References Cited

U.S. PATENT DOCUMENTS

| 5,102,379 | A  | * | 4/1992 | Pagluica | ............... | F16H 57/082 |
| | | | | | | 475/159 |
| 5,391,125 | A | * | 2/1995 | Turra | .................... | F16H 1/2836 |
| | | | | | | 475/331 |
| 7,574,854 | B2 | * | 8/2009 | Moniz | ................... | F01D 25/164 |
| | | | | | | 384/537 |
| 10,526,909 | B2 | * | 1/2020 | McCune | ................. | F01D 15/12 |
| 10,683,773 | B2 | * | 6/2020 | Savaria | ................. | F01D 25/162 |

(Continued)

FOREIGN PATENT DOCUMENTS

| EP | 1 348 879 A1 | 10/2003 |
| EP | 1 806 491 A2 | 7/2007 |
| FR | 2 977 636 A1 | 1/2013 |

(Continued)

OTHER PUBLICATIONS

French Patent Application No. FR2108047; Search Report dated Jul. 24, 2021; 9 pgs.

*Primary Examiner* — Derek D Knight
(74) *Attorney, Agent, or Firm* — Cozen O'Connor

(57) ABSTRACT

A pivot (14) with a longitudinal axis (Y) for a bearing of a mechanical reduction gear, comprising a first annular part (14a) including an axial passage (17) and a second annular part (14b) mounted around the first annular part (14a), the first annular part (14a) delimiting with the second annular part (14b) a lubrication circuit at least one oil inlet (20) of which opens out inwards of the first annular part (14a) into the axial passage (17) and at least one oil outlet (28) of which opens radially outwards of the second annular part (14b).

11 Claims, 4 Drawing Sheets

(56) References Cited

U.S. PATENT DOCUMENTS 10,697,498 B2 * 6/2020 Feraud ................ F16C 33/6674
2022/0325753 A1 * 10/2022 Perdrigeon ............. F01D 25/16

FOREIGN PATENT DOCUMENTS

| FR | 3 047 284 A1 | 8/2017 |
| FR | 3 100 050 A1 | 2/2021 |
| JP | 2008 281191 A | 11/2008 |

* cited by examiner

PIVOT FOR A TURBOMACHINE MECHANICAL REDUCTION GEAR

CROSS-REFERENCE TO RELATED APPLICATION

This application claims the benefit of French Patent Application No. 2108047, filed on Jul. 24, 2021, the disclosure of which is incorporated herein by reference in its entirety.

FIELD

The present invention relates to a pivot for a bearing and more particularly a pivot intended to be integrated into a reduction gear of a turbomachine such as a turbojet engine or a turboprop engine.

CONTEXT

The aim of a mechanical reduction gear is to change the speed and torque ratio between the input axe and output axe of a mechanism.

The new generations of dual-flow turbomachines, in particular those with a high dilution ratio, comprise a mechanical reduction gear to drive the shaft of a fan. Usually, the purpose of the reduction gear is to transform the so-called fast rotation speed of the shaft of a power turbine into a slower rotation speed for the shaft driving the fan.

Such a reduction gear comprises a central pinion, called sun gear, a ring gear and pinions called planet gears, which are engaged between the sun gear and the ring gear. The planet gears are held by a frame called planet carrier. The sun gear, the ring gear and the planet carrier are planetary gears because their axes of revolution coincide with the longitudinal axis X of the turbomachine. The planet gears each have a different axis of revolution Y, they are equally distributed along a circle around the axis of the planetary gears. These axes Y are parallel to the longitudinal axis X.

There are several reduction gear architectures. In the prior art of double-flow turbomachines, the reduction gears are of the planetary or epicyclic type. In other similar applications, there are so-called differential or compound architectures.
- On a planetary reduction gear, the planet carrier is fixed and the ring gear constitutes the output shaft of the device which rotates in the opposite direction to the sun gear.
- On an epicyclic reduction gear, the ring gear is fixed and the planet carrier constitutes the output shaft of the device which rotates in the same direction as the sun gear.
- On a differential reduction gear, no element is fixed in rotation. The ring gear rotates in the opposite direction of the sun gear and the planet carrier.

The reduction gears may have one or more meshing stages. This meshing is achieved in different ways such as by contact, by friction or even by magnetic fields. There are several types of contact meshing, such as straight or herringbone toothings.

Each planet gear carried by the planet carrier is mounted free in rotation on a pivot. The use of a pivot forming with a planet pinion a plain bearing allows reducing the bulk and the mass and offers an almost unlimited service life, provide that they are constantly supplied with lubricating and cooling oil. It should also be noted that a pivot could be used with a rolling bearing whose inner race would be carried by the pivot, the outer race being rotatably secured to a planet gear.

It is known that the temperature of the pivots determines the bearing capacity of the bearing whether it is a hydrodynamic or rolling one. The higher the temperature, the less would be the bearing, i.e. the load capacity, of the pivot. Hence, it should be understood that mastering the temperature of the pivot is essential to be able to guarantee an effective bearing.

SUMMARY OF THE INVENTION

Thus, a pivot with a longitudinal axis for a bearing of a mechanical reduction gear is provided, comprising a first annular part including a lubrication axial passage and a second annular part mounted around the first annular part, the first annular part delimiting with the second annular part a lubricating oil circuit at least one oil inlet of which opens out inwards of the first annular part into the axial passage and at least one oil outlet of which opens radially outwards of the second annular part.

Unlike the prior technique, the pivot is formed of two distinct parts and an oil circuit is formed in the pivot so as to cool down the pivot. Thus, for a given load under given operating conditions, lowering the temperature of the pivot, allows reducing the dimension of the pivot, thus allowing for a weight saving. When the pivot is used in a mechanical reduction gear, it should be understood that the reduction of the mass of several pivots turns out to be even more advantageous.

According to another feature, the first annular part comprises an annular wall in which are formed a plurality of annular grooves around which the second annular part is sealingly mounted. The annular grooves are open radially outwards and the radially outer openings of the annular grooves are plugged or closed by the second annular part.

According to another feature, the lubricating oil circuit comprises a plurality of annular grooves formed in an annular wall, the second annular part being mounted around the annular grooves and sealingly mounted around these.

The first annular part and the second annular part may be made by casting or by additive manufacturing. The assembly allows simplifying the design of the first annular part and of the second annular part.

The annular grooves may be in fluidic connection with each other.

The oil inlet of the lubricating oil circuit opens out into an annular groove positioned longitudinally at the mid-length of the pivot.

The pivot may comprise 2k+1 annular grooves, k being a positive integer, preferably greater than or equal to 3. In a particular embodiment, the number of annular grooves may be equal to 5.

The annular grooves could fluidly connect by means of openings, such as slots, formed in annular partition walls of the annular grooves. Orifices may be formed in the annular partition walls.

Each groove may comprise a radial wall joining two consecutive partition walls so as to prevent oil circulation over 360°, each radial wall circumferentially separating a first circumferential end of the annular groove and a second circumferential end of the annular groove, each annular groove comprising an oil inlet at its first circumferential end and an oil outlet at its second circumferential end.

Thus, oil circulates circumferentially from the first circumferential end of an annular groove to the second circumferential end of said annular groove so as to enable oil circulation over substantially 360° and thus annularly cool down the pivot as best as possible.

Each of the two annular grooves at longitudinal ends may comprise an oil outlet connected to a channel a downstream end of which opens radially outwards of the second annular part.

The invention also relates to a mechanical reduction gear for a gas turbomachine, comprising a ring gear and planet gears engaged with the sun gear and with the ring gear and each mounted free in rotation about their axis on a planet carrier, each of the planet gears being able to rotate about their axis through a pivot as described before.

It also relates to a gas turbomachine for an aircraft comprising such a mechanical reduction gear whose sun gear surrounds and is rotatably secured to a shaft of the compressor of the turbomachine.

The turbomachine may also be such that the ring gear is secured to a static annular casing or shroud of the low-pressure compressor.

The pivot according to the present document may be used in a hydrodynamic plain bearing or else in a rolling bearing, for example a ball or a cylindrical roller bearing.

The invention will be better understood and other details, features and advantages of the invention will appear upon reading the following description made as a non-limiting example with reference to the appended drawings.

DETAILED DESCRIPTION

Figure 1:
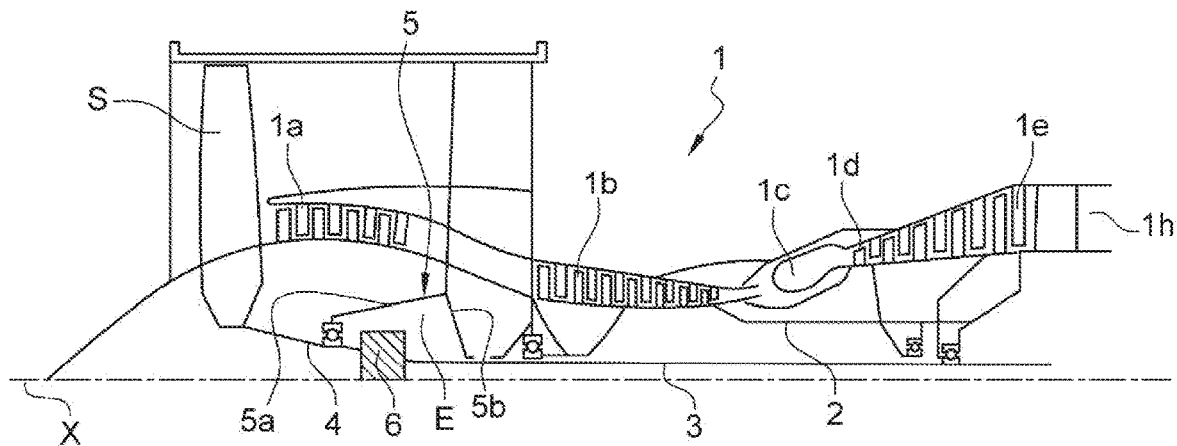
FIG. 1 is a schematic axial sectional view of a turbomachine using the invention.

FIG. 1 describes a turbomachine 1 which conventionally comprises a fan S, a low-pressure compressor 1a, a high-pressure compressor 1b, an annular combustor chamber 1c, a high-pressure turbine 1d, a low-pressure turbine 1e and an exhaust nozzle 1h. The high-pressure compressor 1b and the high-pressure turbine 1d are connected by a high-pressure shaft 2 and form a high-pressure (HP) body with it. The low-pressure compressor 1a and the low-pressure turbine 1e are connected by a low-pressure shaft 3 and form a low-pressure body (LP) with it.

The fan S is driven by a fan shaft 4 which is driven to the LP shaft 3 by means of a reduction gear 6. This reduction gear 6 is usually of the planetary or epicyclic type.

The following description refers to a reduction gear of the epicyclic type, the planet carrier and the sun gear are in rotation, the ring gear of the reduction gear being fixed in the reference of the engine. That being so, the description also applies to a reduction gear of another type, such as a planetary or differential reduction gear.

The reduction gear 6 is positioned in the upstream part of the turbomachine. In this patent application, the terms upstream and downstream refer to the direction of the general flow of gases in the turbomachine, along its axis of extension or rotation of its rotors. A fixed structure comprising schematically, here, an upstream part 5a and a downstream part 5b which makes up the engine casing or stator 5 is arranged so as to form an enclosure E surrounding the reduction gear 6. This enclosure E is herein closed upstream by seals at the level of a bearing allowing the passage of the fan shaft 4, and downstream by seals at the level of the passage of the LP shaft 3.

Figure 2:
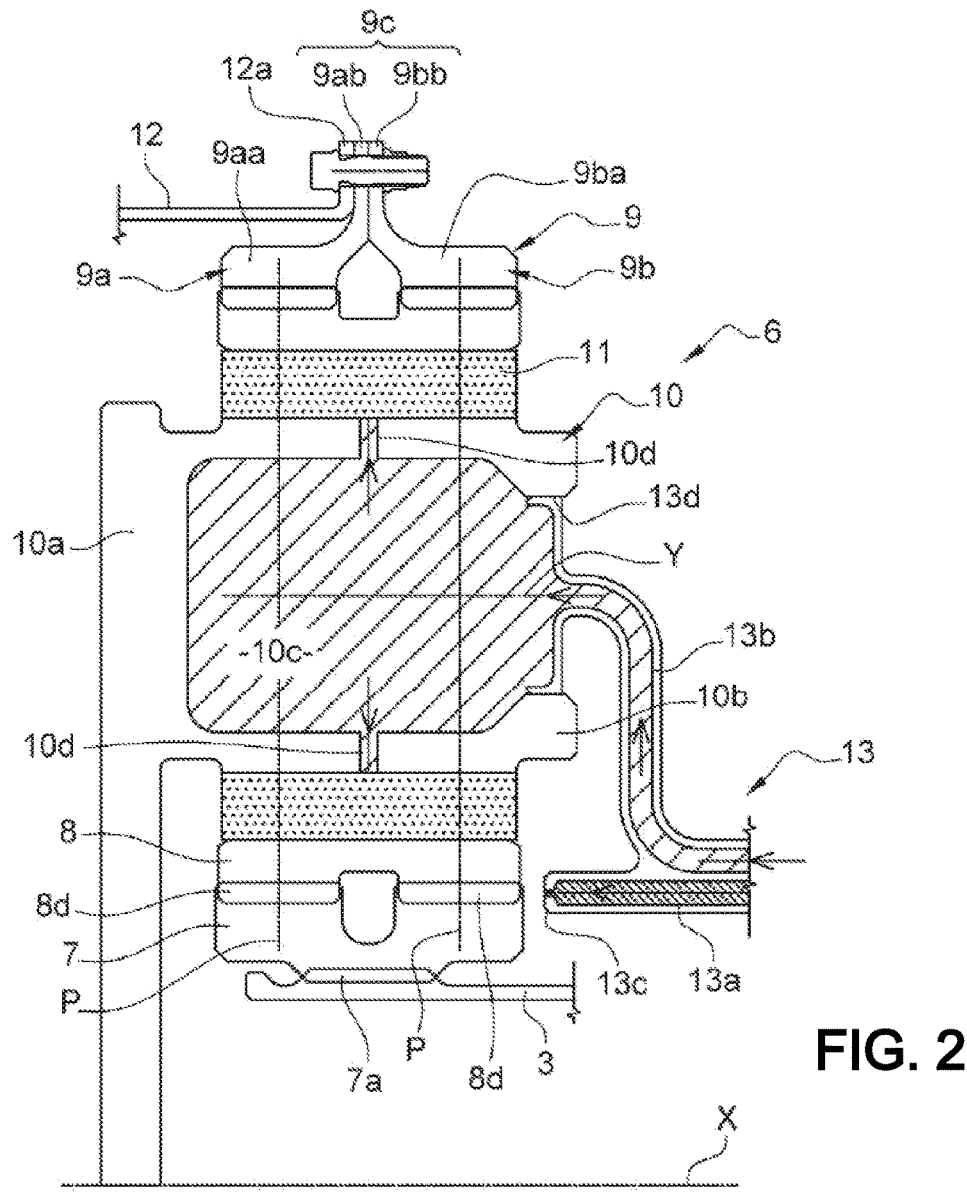
FIG. 2 is a partial axial sectional view of a mechanical reduction gear.

FIG. 2 shows an epicyclic reduction gear 6. The reduction gear 6 is connected on the input side to the LP shaft 3, for example via internal splines 7a. In this way, the LP shaft 3 drives a planetary pinion called the sun gear 7. Classically, the sun gear 7, whose axis of rotation is combined with that of the turbomachine X, drives a series of pinions called planet gears 8, which are equally distributed on the same diameter around the axis of rotation X. This diameter is equal to twice the operating centre distance between the sun gear 7 and the planet gears 8. The number of planet gears 8 is generally defined between three and seven for this type of application.

The assembly of planet gears 8 is held by a frame called planet carrier 10. Each planet gear 8 rotates around its own axis Y and meshes with the ring gear 9.

On the output side we have:

In this epicyclic configuration, the set of the planet gears 8 rotatably drives the planet carrier 10 around the axis X of the turbomachine. The ring gear is fixed to the engine casing or stator 5 via a ring gear carrier 12 and the planet carrier 10 is fixed to the fan shaft 4.

In another planetary configuration, the assembly of the planet gears 8 is held by a planet carrier 10 which is attached to the engine casing or stator 5. Each planet gear drives the ring gear which is brought back to the fan shaft 4 via a ring gear carrier 12.

Each planet gear 8 is mounted freely in rotation by means of a bearing 11, for example of the rolling bearing or hydrodynamic bearing type. Each bearing 11 is provided on one of the tubular supports 10b of the planet carrier 10 and all the supports are positioned relative to each other by means of one or more structural frames 10a of the planet carrier 10. The bearing may be formed by a pivot around which a planet gear is mounted thus forming a hydrodynamic bearing. The bearing may be of the rolling type and comprise an inner race formed or secured to the pivot and an outer race secured to the planet gear. There is a number of tubular supports 10b and bearings 11 equal to the number of planet gears. For operational, mounting, manufacturing, control, repair or replacement reasons, the supports 10b and the frame 10a can be separated into several parts.

For the same reasons as mentioned above, the toothing of a reduction gear can be separated into several helixes, each having a median plane P. In our example, we detail the operation of a reduction gear with several helices with one ring gear separated into two half-ring gears:

An upstream half ring gear 9a consisting of a rim 9aa and a fastening half-flange gab 9ab. On the rim 9aa is located the upstream helix of the toothing of the reduction gear. This upstream helix meshes with that of the planet gear 8 which meshes with that of the sun gear 7.

A downstream half ring gear 9b consists of a rim 9ba and a fastening half-flange 9bb. On the rim 9ba is located the downstream helix of the toothing of the reduction gear. This downstream helix meshes with that of the planet gear 8 which meshes with that of the sun gear 7.

If the widths of helix vary between the sun gear 7, the planet gears 8 and the ring gear 9 because of the toothing overlaps, they are all centred on a median plane P for the upstream helixes and on another median plane P for the downstream helixes. In the case of a double row roller bearing, each row of rolling elements is also preferably, but not necessarily, centred on two median planes.

The fastening half-flange gab of the upstream ring gear 9a and the fastening half-flange 9bb of the downstream ring gear 9b form the fastening flange 9c of the ring gear. The ring gear 9 is fixed to a ring gear carrier by assembling the fastening flange 9c of the ring gear and the fastening flange 12a of the ring gear carrier using a bolted assembly for example.

The arrows in FIG. 2 describe the oil flow in the reduction gear 6. The oil enters reduction gear 6 from the stator part 5 into a distributor 13 by different means which will not be specified in this view because they are specific to one or more types of architecture. The distributor 13 comprises of injectors 13a and arms 13b. The function of the injectors 13a is to lubricate the toothings and the function of the arms 13b is to lubricate the bearings. The oil is fed to the injector 13a to exit through the end 13c to lubricate the toothings. The oil is also fed to the arm 13b and flows through the supply port 13d of the bearing 11. The oil then flows through the support 10b into one or more cavities 10c to exit through pipes 10d to lubricate the bearings of the planet gears.

Figure 3:
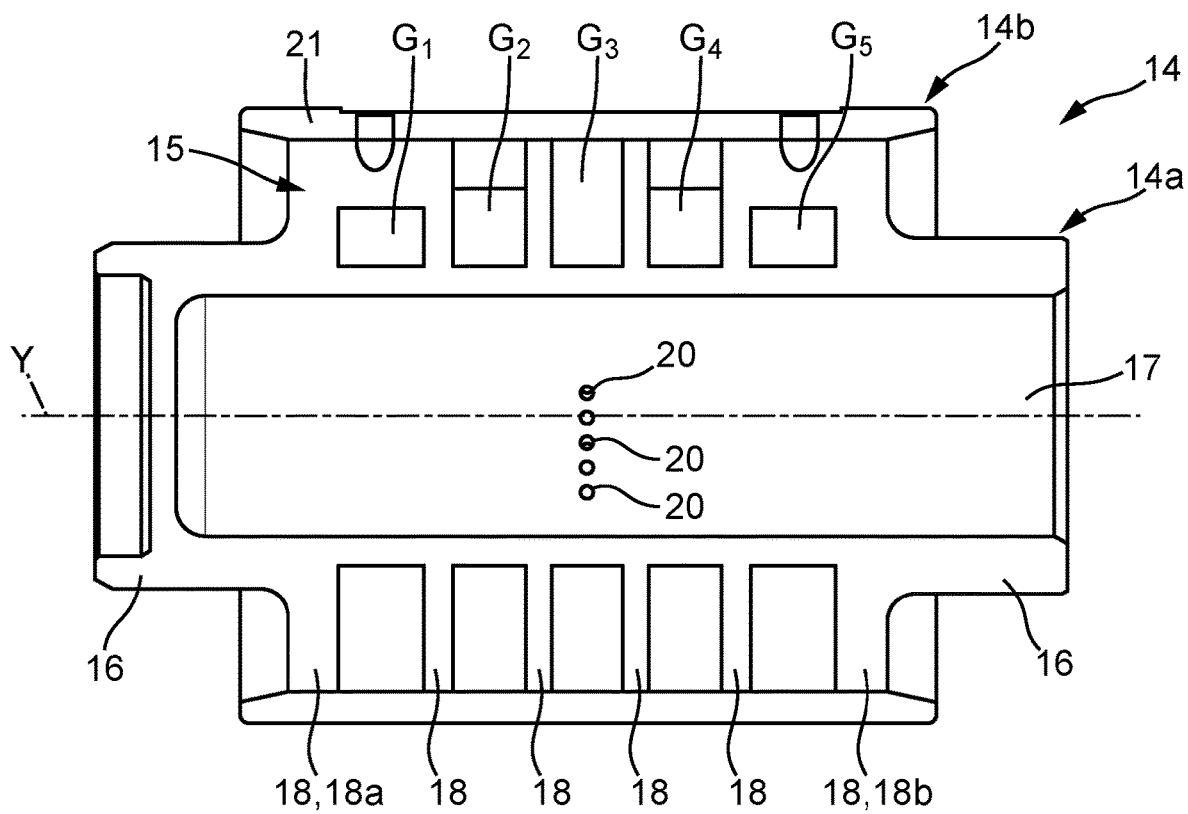
FIG. 3 is a schematic view of a pivot according to the present invention and according to a sectional plane comprising the longitudinal axis Y of the pivot.
Figure 4:
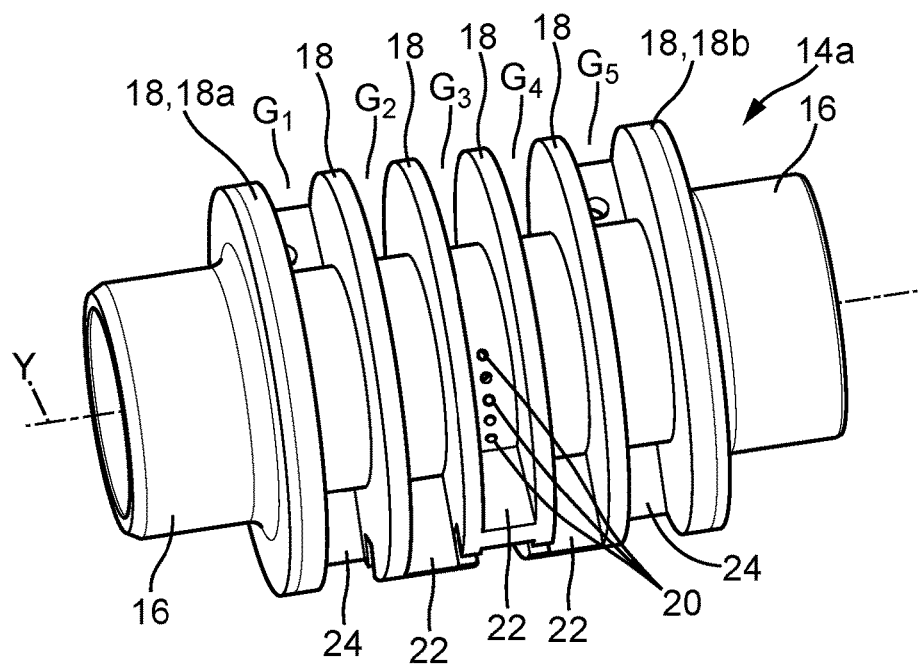
FIG. 4 is a schematic perspective view of the first annular part of the pivot according to the present invention.

Thus, the bearing comprises a pivot 14 as represented in FIGS. 3 et seq. More particularly, FIG. 3 represents the pivot 14 in its entirety comprising a first annular part 14a and a second annular part 14b. FIG. 4 represents the first annular part 14a separately.

According to the invention, the second annular part 14b externally surrounds the first annular part 14a. The first annular part 14a comprises an annular wall 15 connected at its ends to two tubular portions 16. The annular wall 15 and the tubular portions 16 delimit together an axial passage 17 therein. This passage is tubular and is coaxial with the axis Y of the pivot. The first annular part 14a comprises a plurality of annular grooves G1, G2, G3, G4, G5 along the longitudinal axis Y of the pivot 14. The annular grooves G1, G2, G3, G4, G5 are laterally delimited by radial annular partition walls 18. The radial annular partition walls 18, with the exception of the longitudinal end partition walls 18a, 18b comprise openings 19, such as slots, enabling the passage of oil from one annular groove to another.

The first annular part 14a comprises an off number of grooves, i.e. 2k+1 annular grooves, with k a positive integer. It could also comprise an even number of annular grooves. In the case illustrated in the figures, the first annular part comprises 5 annular grooves, namely a first annular groove G1 at a longitudinal end, a second annular groove G2, a third annular groove G3, a fourth annular groove G4 and a fifth annular groove G5 at a longitudinal end.

The second annular part 14b comprises a cylindrical wall 21 sealingly mounted (tight assembly) around the first annular part 14a so that a radially inner cylindrical surface of this cylindrical wall 21 plugs or closes the annular grooves G1, G2, G3, G4, G5 by coming against the radially outer ends of the radial annular partition walls 18. The annular grooves G1, G2, G3, G4, G5 are in fluidic connection with each other so as to from an oil circuit between the first annular part 14a and the second annular part 14b.

As visible in FIG. 4, the first annular part 14a comprises at least one oil inlet 20 for cooling the pivot 14. In this case, it comprises a plurality of oil inlet orifices 20 substantially aligned circumferentially, these orifices 20 opening out radially inwards into the axial passage and being able to be fluidly connected to the previously-described channels 10d. These oil inlet orifices open out into the third annular groove G3.

Figure 5:
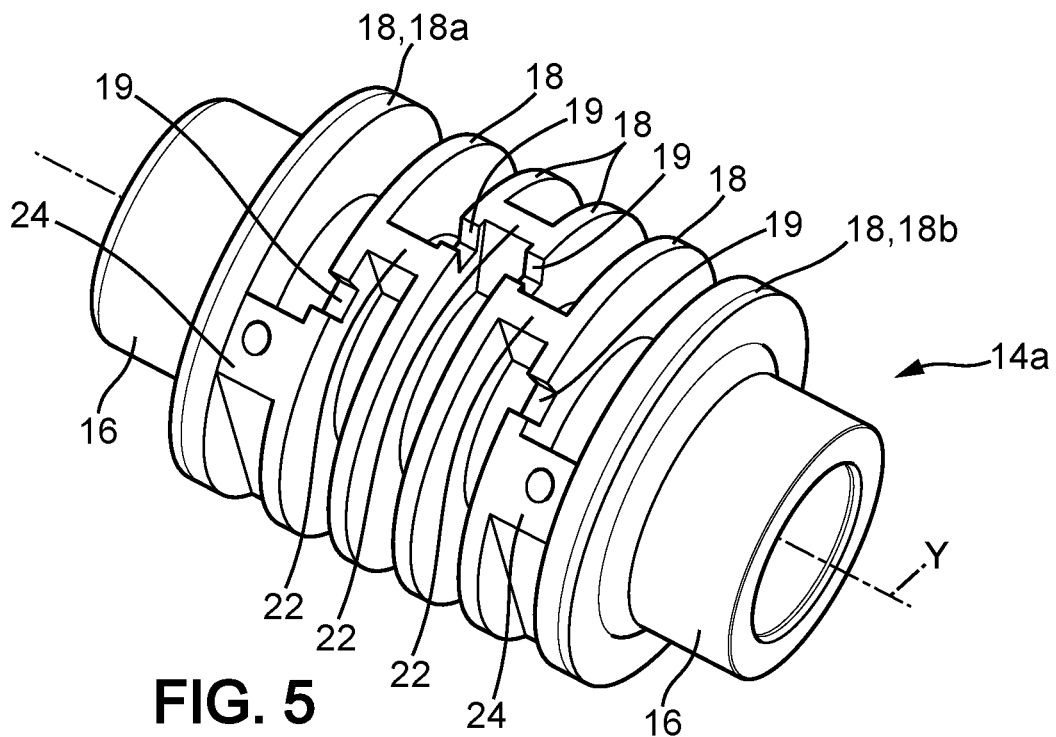
FIG. 5 is another schematic perspective view of the first annular part of the pivot according to the present invention.
Figure 6:
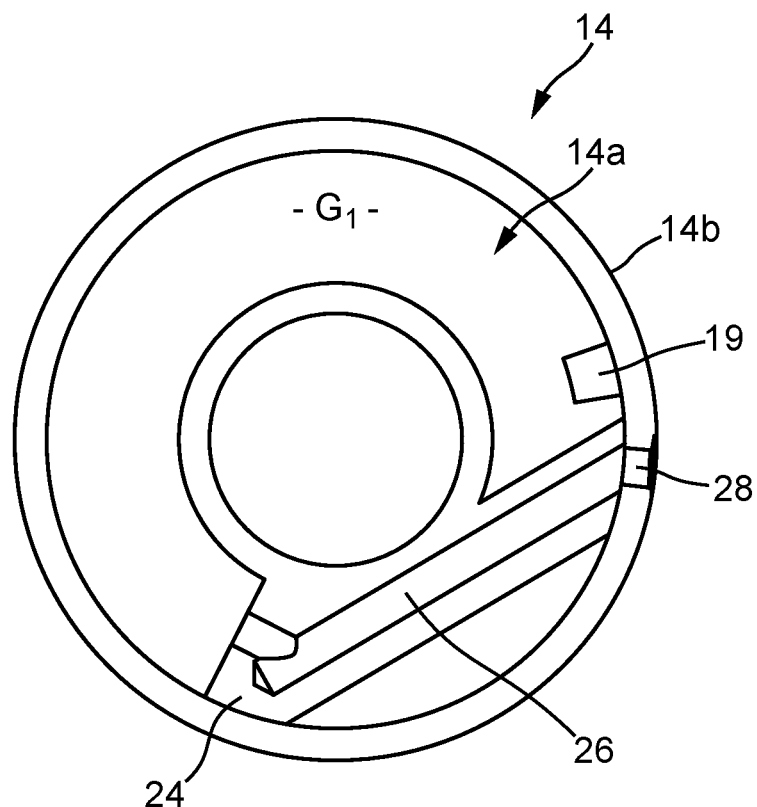
FIG. 6 is a schematic view of a pivot according to the present invention, according to a sectional plane substantially perpendicular to the longitudinal axis Y of the pivot.

Each annular groove G1, G2, G3, G4, G5 comprises a radial wall 22 or a wall element 24 joining two consecutive partition walls so as to prevent oil circulation over 360°, each radial wall 22 or wall element 24 circumferentially separating a first circumferential end of the annular groove and a second circumferential end of the annular groove (FIGS. 4 and 5). One could observe that in the case of the second G2, third G3 and fourth G4 annular grooves, the radial wall extend longitudinally and that in the case of the first G1 and fifth G5 annular grooves, the wall element 24 extends over a larger angular distance and accommodates an oil flow channel 26 whose upstream end is connected to the second circumferential end of the first annular groove G1 and of the fifth annular groove G5 and whose downstream end is connected to an oil outlet 28 formed in the cylindrical wall 21 of the second annular part 14b (FIG. 6).

Each annular groove G1, G2, G3, G4, G5 comprises an oil inlet at its first circumferential end and an oil outlet at its second circumferential end. More particularly, the oil inlet in the third annular groove G3 is formed by the orifices 20 formed at the first circumferential end of the third annular groove G3. This third annular groove G3 comprises two oil outlets arranged at its second circumferential end, a first one being formed by an opening 19 for supplying with oil the first circumferential end of the second annular groove G2 and by an opening 19 for supplying with oil the first circumferential end of the fourth annular groove G4. Afterwards, oil flows over 360° up to the second circumferential end of the second annular groove G2 and up to the second circumferential end of the fourth annular groove G4. Afterwards, it penetrates into the first annular groove G1 at its first circumferential end through an opening 19 and into the fifth annular groove G5 at its first circumferential end through an opening 19. Afterwards, it flows into the first G1 and fifth G5 annular grooves, then into the respective channels 26 up to the oil outlet orifices 28 of the second annular part 14b.

Making of an oil circuit in the pivot 14 allows lowering its operating temperature which enables a reduction in its dimensions while allowing for an unchanged load resistance. Thus, the mass of the pivot is reduced as well as that of the mechanical reduction gear. In the case of an epicyclic configuration, the reduction of the mass reduces the radial loads of the planet carrier which could also have a mass that would be reduced.

Figure 7:
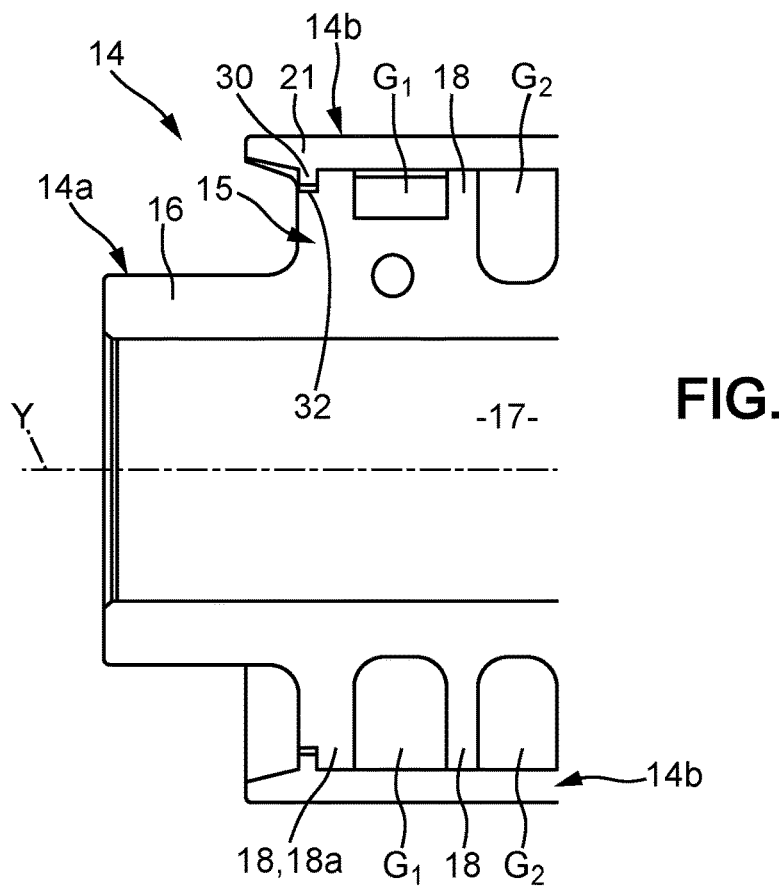
FIG. 7 is a schematic view of a longitudinal end of the pivot according to the invention.
Figure 8:
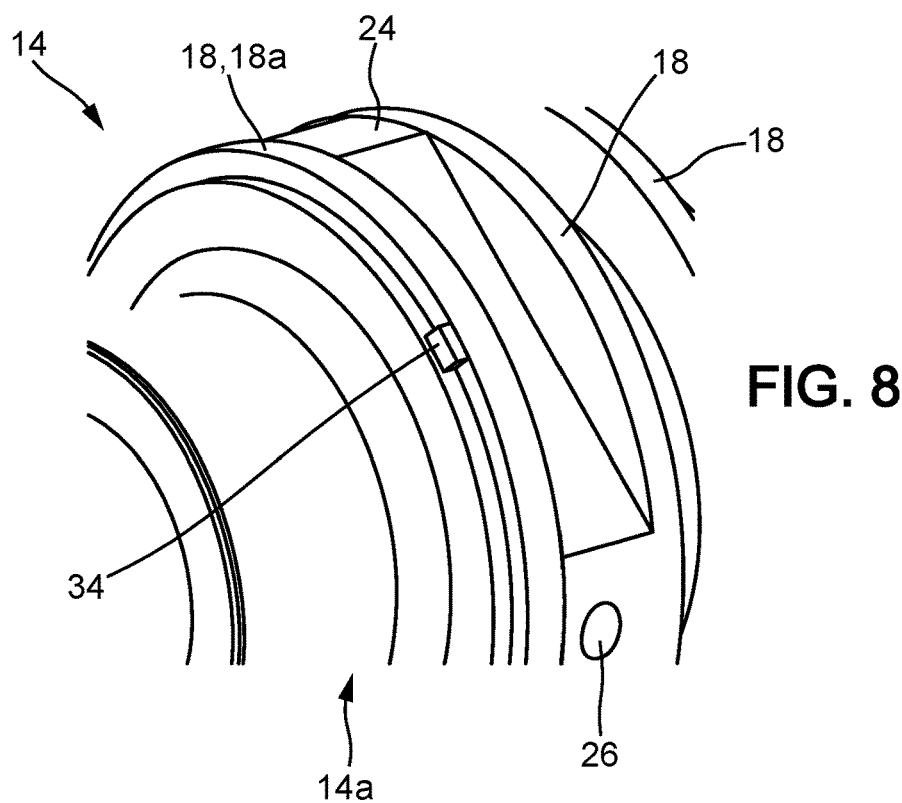
FIG. 8 is a schematic view of a longitudinal end of the first part of the pivot.

FIG. 7 illustrates a possible mechanical connection between the first annular part 14a and the second annular part 14b to enable axial blockage of the two annular parts together. This axial blockage may be achieved by the presence of an annular flange 30 extending radially inwards from the cylindrical wall 21 of the second annular part and which is fitted into an annular groove 32 of the first annular part 14a. Other blocking means may be considered such as screwing or welding. A rotational blockage of the first annular part 14a and second annular part 14b may be provided for and made for example by the formation of a notch 34 on a radial annular partition wall 18, this notch 24 cooperating with a member of the second annular part 14b (FIG. 8).

The invention claimed is:

1. A reduction gear for a gas turbomachine with a longitudinal axis, comprising:
   a ring gear and planet gears (8) engaged with a sun gear (7) and with the ring gear (9) each mounted free in rotation about their axis (Y) on a planet carrier (10),
   each of the planet gears (8) being configured to rotate about their axis (Y) through a pivot (14) which comprises a first annular part (14a) including a lubrication axial passage (17) and a second annular part (14b) mounted around the first annular part (14a), the first annular part (14a) delimiting with the second annular part (14b) a lubrication circuit at least one oil inlet (20) of which opens out inwards of the first annular part (14a) into the axial passage (17) and at least one oil outlet (28) of which opens radially outwards of the second annular part (14b),
   the first annular part (14a) comprising an annular wall (15) delimiting the axial passage (17) therein, the axial passage (17) being tubular and coaxial with the axis (Y) of the pivot.

2. The reduction gear according to claim 1, wherein the first annular part (14a) comprises an annular wall (15) in which a plurality of annular grooves (G1, G2, G3, G4, G5) are formed around which the second annular part (14b) is sealingly mounted.

3. The reduction gear according to claim 2, wherein the annular grooves (G1, G2, G3, G4, G5) are in fluidic connection with each other.

4. The reduction gear according to claim 3, wherein the oil inlet (20) of the lubrication circuit opens out into an annular groove (G1, G2, G3, G4, G5) positioned longitudinally at the mid-length of the pivot (14).

5. The reduction gear according to claim 2, a total number of the plurality of annular grooves being 2k+1, k being a positive integer.

6. The reduction gear according to claim 3, the total number being greater than or equal to three.

7. The reduction gear according to claim 2, wherein the annular grooves (G1, G2, G3, G4, G5) fluidly connect by means of openings (19), such as slots, formed in annular partition walls (18) of the annular grooves (G1, G2, G3, G4, G5).

8. The reduction gear according to claim 7, wherein:
   each annular groove (G1, G2, G3, G4, G5) comprises a radial wall (22, 24) joining two consecutive partition walls (18), so as to prevent oil circulation over 360;
   and each radial wall (22, 24) circumferentially separating a first circumferential end of its annular groove (G1, G2, G3, G4, G5) and a second circumferential end of its annular groove, each of the plurality of annular grooves (G1, G2, G3, G4, G5) comprising an oil inlet at its first circumferential end and an oil outlet at its second circumferential end.

9. The reduction gear according to claim 8, wherein the plurality of annular grooves includes two annular grooves (G1, G5) at longitudinal ends, each of the two annular grooves includes an oil outlet connected to a channel (26) whose downstream end opens out radially outwards of the second annular part (14b).

10. A gas turbomachine for an aircraft comprising:
    a reduction gear (6) of claim 1, wherein sun gear (7) surrounds and is rotatably secured to a shaft of the compressor of the gas turbomachine.

11. The turbomachine according to claim 10, wherein the ring gear is secured to a stator annular casing or shroud.

* * * * *